(12) United States Patent
Kataria et al.

(10) Patent No.: US 7,376,870 B2
(45) Date of Patent: May 20, 2008

(54) SELF-MONITORING AND UPDATING OF FIRMWARE OVER A NETWORK

(75) Inventors: Mukesh Kataria, Folsom, CA (US);
Andrew H. Gafken, Folsom, CA (US);
William A. Stevens, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 10/957,444

(22) Filed: Sep. 30, 2004

(65) Prior Publication Data

US 2006/0075276 A1    Apr. 6, 2006

(51) Int. Cl.
*G06F 11/00* (2006.01)
(52) U.S. Cl. .............................. 714/47; 714/3
(58) Field of Classification Search ............... 714/1, 714/3, 25, 47, 48; 713/3; 340/2.23
See application file for complete search history.

(56) References Cited

U.S. PATENT DOCUMENTS

| | | | | |
|---|---|---|---|---|
| 5,844,986 | A * | 12/1998 | Davis | 713/187 |
| 5,938,764 | A * | 8/1999 | Klein | 713/1 |
| 6,640,334 | B1 | 10/2003 | Rasmussen | |
| 6,971,095 | B2 * | 11/2005 | Hirai et al. | 717/173 |
| 7,043,664 | B1 * | 5/2006 | Chiloyan | 714/5 |
| 2004/0103347 | A1 * | 5/2004 | Sneed et al. | 714/32 |

FOREIGN PATENT DOCUMENTS

| | | |
|---|---|---|
| EP | 1 100 014 A2 | 5/2001 |
| JP | 2001 216103 A | 8/2001 |
| WO | WO98/54642 | 12/1998 |
| WO | WO 2004/038561 A2 | 5/2004 |

OTHER PUBLICATIONS

Fault Tolerant Software / Firmware Emulation of Modem User Configurations; IBM Tech Disclosure bulletin, NY, USA; vol. 38, No. 6; Jun. 1, 1995; XP000520608; p. 139-140.
Int'l Application No. PCT/US2005/035373 Int'l Search Report & Written Opinion dated Dec. 6, 2006.

* cited by examiner

*Primary Examiner*—Dieu-Minh Le
(74) *Attorney, Agent, or Firm*—Grossman, Tucker, Perreault & Pfleger, PLLC (57) ABSTRACT

Embodiments include monitoring a computing system to determine whether firmware of the computing system is corrupted, hung up, or requires automatic update. The computing system may then request firmware update data over a network. Moreover, the computing system may include a controller with capability to determine whether the firmware is corrupted or hung and request and receive firmware update data over a network. In addition, the controller may have the capability operate when the firmware is corrupted or hung up, if the processor is held up, and if the operating system is halted, hung up, or soft-off. In addition, if the controller detects that the firmware is corrupted or hung up, the controller may halt the processor while updating the firmware.

16 Claims, 4 Drawing Sheets

SELF-MONITORING AND UPDATING OF FIRMWARE OVER A NETWORK

BACKGROUND

1. Field

Updating and recovering system firmware.

2. Background

During initialization and/or use of electronic devices, such as computing systems, firmware "program" is often used to detect, test, initialize, and monitor the device or system hardware. For example, when a personal computer (PC) is turned on, typically a basic input/output system (BIOS) program (e.g. firmware) which is software stored in or programmed into a read-only memory (ROM) chip on the PC motherboard, commonly referred to as the BIOS chip, is run. Upon being run the BIOS instantly identifies all of the onboard devices (e.g. such as the processor, memory, video card, etc.) and then runs the Power-on self-test (POST) to determine whether or not each device is working properly. If all of the devices pass the POST test then the BIOS initializes each device, detects hard drives, compact disks-ROM (CD-ROM) drives, and floppy drives. Then the BIOS searches the first boot device (normally the hard drive or floppy drive) for files necessary to load the operating system software. The BIOS may handle low-level input/output (I/O) to peripheral controllers such as the keyboard and display controllers. Moreover, the BIOS will detect, test, initialize, and monitor the system hardware until the operating system takes over. Then, the BIOS may pass control of the system to the operating system software. If any device fails the POST, then an error message will be displayed on the screen or a series of "beeps" will be played through the PC speaker to indicate that a problem exists. The sequence of beeps (beep code) can be used to identify the type of problem that exists.

However, the BIOS or firmware is typically "burned" into one portion of the ROM chip and written or programmed into a second portion of the ROM chip. Although the "burned" portion may be "flash" erased by hardware mechanisms (e.g., such as by ultraviolet light irradiation), the second portion may be erased or written over by software mechanisms. As a result, it is possible for the BIOS or firmware to become corrupted, inaccurate, or undesirably altered by a "virus", "worm", or "hacker." Moreover, it is possible that the user of the computing system may alter the BIOS, unintentionally, to an undesirable configuration. Thus, it is important to be able to recover and update the BIOS or firmware to insure that is accurate.

DETAILED DESCRIPTION

Figure 1:
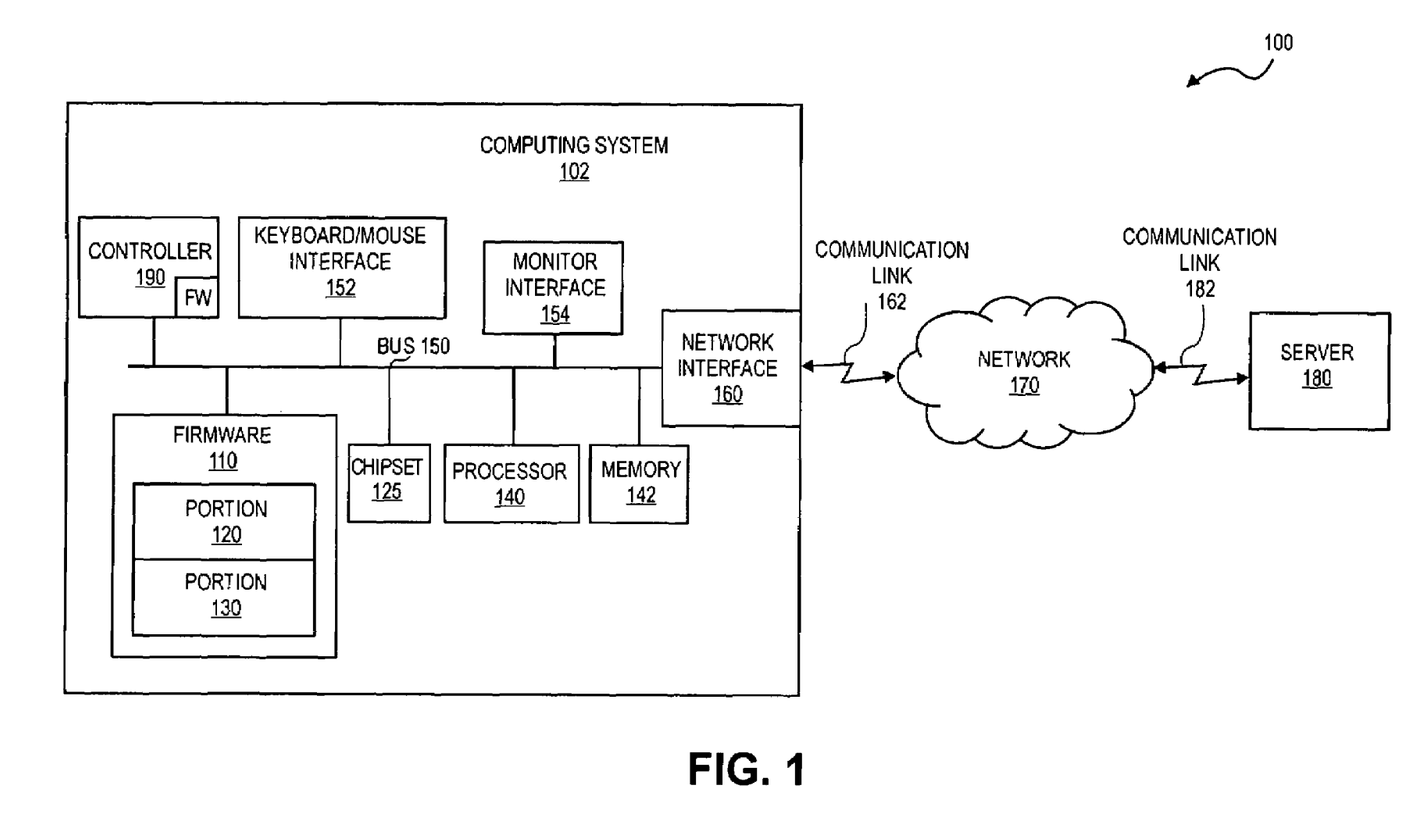
FIG. 1 is a block diagram of a system to self-monitor and update of firmware over a network.

FIG. 1 is a block diagram of a system to self-monitor and update of firmware over a network. FIG. 1 shows computing environment 100 including computing system 102 connected to network 170 by communication link 162, and server 180 connected to network 170 by communication link 182. Computing device 102 may be a client computer, server computer, desktop computer, laptop computer, personal digital assistant (PDA), cellular telephone, or any other digital processor or processing system having an operating system and firmware.

As shown in FIG. 1, computing system 102 includes bus 150 connected to communication link 162 by network interface 160. Bus 150 may be a computer bus, such as a bus on a motherboard for interfacing various components of a computer. Network interface 160 may be a network interface for connecting to a local area network (LAN), intranet, the Internet, or another electronic device or computing system communication supporting network. Correspondingly, communication link 162 and network 170 may support communication over such networks. Specifically, for instance, network 170 may be a local area network (LAN), intranet, or the Internet. It is also contemplated that network 170 may include more than one type of network and/or technology to provide communication between electronic devices and/or computing systems. Specifically, network 170 may include wireless communication, cellular communication, LAN communication, and the Internet. Communication link 182 may be a link similar to that described above for communication link 162. Server 180 may be a network server, a computing system similar to computer system 102, or another computer server to provide functionality as described herein.

Computing system 102 is also shown including keyboard/mouse interface 152 connected to bus 150. Keyboard mouse interface 152 may be an interface for connecting a keyboard and/or mouse to computer system 102 to provide input thereto. Also shown, monitor interface 154 is connected to bus 150. Monitor interface 154 may provide an interface or appropriate signal to a screen or monitor attached to computing system 102. For example, monitor interface 154 may be a video or display card.

FIG. 1 also shows memory 142 connected to bus 150. Memory 142 may represent random assess memory (RAM), memory storage, universal serial bus (USB) memory, a hard drive, a CD-ROM, an optical disk, and/or a floppy disk. Memory 142 may be a machine accessible medium, such as a medium for containing instructions, that when executed by a processor cause computing system 102 to perform computer-related tasks, including those described herein, such as communicating with other computing systems and/or server 180 via network 170.

Also shown, is processor 140 connected to bus 150. Processor 140 may be a central processing unit (CPU), digital signal processor, or other processor. It can be appreciated that processor 140 may be a processor for processing instructions provided by or stored in memory 142, such as to cause computing system 102 to perform computer-related tasks, including those described herein, such as communicating with other computing systems and/or server 180 via network 170. Processor 140 may execute or run an operating system stored or accessible from memory 142. Thus, computing system 102 may be a client computer or client system capable of accessing server 180 via network 170.

FIG. 1 also shows firmware 110 connected to bus 150. Firmware 110 may be computer basic input/output system (BIOS), client system firmware (CSF) or other instructions for testing, initializing, and loading the boot program or operating system of computing system 102. Firmware 110 may be stored in a memory, such as a read-only memory (ROM), non-volatile memory, erasable programmable ROM (EPROM), electrically erasable programmable ROM (EE- PROM), or flash memory. For example, firmware 110 may be stored in a memory that is not erased when power is removed from or turned off (hard off) for computing system 102. Also, firmware 110 may be stored in a memory that may be erased, such as by exposing or radiating the memory with ultraviolet light, to allow the memory to be updated, recovered, or rewritten with subsequent data, such as by "burning" it into the memory. It is also contemplated that firmware 110 may be updated by other processes, firmware, software, and/or hardware.

Update to or recovery of firmware, such as BIOS and firmware 110, may be necessary if the firmware is corrupted. Firmware may be considered corrupted if it has an inaccurate configuration data as compared to the devices of the computing system; or causes the operating system or processor to become halted, hung up, or to enter a soft-off status. For example, becoming halted may be when a hardware stop or other failure causes the operating system and/or processor to discontinue processing of firmware, software, or operating system instructions. Similarly, becoming hung up may be when a software looping problem or other failure causes the operating system and/or processor to discontinue processing of firmware, software, or operating system instructions. Finally, soft-off may refer to when power is on for the computing system, however, the operating system and/or processor discontinue processing of firmware, software, or operating system instructions due to the computing system being in power save mode, or another hardware or software mode.

The firmware may also be updated or recovered to remove a "bug" or error in a feature or process, add a feature or process, or enhance a feature or process of the firmware (e.g., such as to add a configuration of a new device). Moreover, it may be desired to update or recover the firmware if the firmware has been corrupted or altered by a "virus," "worm" or "hacker." In some instances it also may be desirable to automatically update the firmware, such as at a selected time, or periodically, such as to ensure that the firmware continues to be accurate, or such as to provide updates to the firmware as described herein.

FIG. 1 also shows controller 190 connected to bus 150. Controller may include a computer chip, digital signal processor, an embedded micro-controller, firmware, circuitry, computer hardware, and/or computer software stored therein. Specifically, controller 190 is shown having firmware FW. Controller 190 may be an intelligent network controller (INC) having a "logic" such as code, programming, firmware FW, data, intelligence, and/or computer software to perform the tasks described herein. In general, the code, programming, data, intelligence, computer software, firmware, hardware, and/or computer hardware described herein may be defined as "logic" in the sense that such logic has the capability to perform the functions described with respect to the logic.

For instance, controller 190 may include logic to monitor firmware 110, and to communicate with server 180. More particularly, controller 190 may include logic for communicating with firmware 110, and server 180 across network 170 to retrieve firmware images form server 180 to update firmware 110. The logic of controller 190 may have the capability to request and receive over a network, updated configuration or firmware data for firmware 110. For instance, controller 190 may also have the ability to perform secure communication with server 180 over network 170 using a secure server session or encrypted data. Specifically, communications between computing system 102 and server 180 over communication links 162 and 182, and network 170 may be a secure server session, such as a transactional layer secure (TSL) server session, and/or may use encrypted data, such as Ribest Shamir Adleman (RSA) encrypted data, or another public/private key encryption of data. Controller 190 may also have logic to return the received updated configuration or firmware data to firmware 110, or to write over firmware 110 with the received updated configuration or firmware data.

Controller 190 may have sufficient logic to have a functional presence when portion 120 is executing or corrupted. According to embodiments, controller 190 includes logic or firmware that executes independently of firmware 110, so that controller 190 is fully functional even when portion 120 is corrupted or hung-up; processor 140 is held or halted; the operating system of computing system 102 is hung-up, halted; or soft-off; and/or computing system 102 is hung-up, halted, or soft-off. For example, processor 140 may be held or halted when a hardware or software failure causes the processor to discontinue processing of firmware, software, or operating system instructions. Thus, controller 190 may be fully functional when processor 140, or the operating system of computing system 102 is hung-up, halted, or soft-off.

Moreover, controller 190 may have sufficient logic to communicate with firmware 110 to receive indications that portions of the firmware are corrupted and to receive requests for original, or updated firmware, to be retrieved from server 180. Controller 190 may also have or store firmware or a memory, revision information, release date, etc.

Controller 190, memory 142, and/or firmware 110 may have logic, information and/or mechanisms to obtain identification information, revision information, release dates, etc., of firmware 110, the operating system of computing system 102, and/or computing system 102 itself. For example, identification of computing system 102 may be a unique identification of computing system 102 amongst similar computing systems (e.g., such as amongst other client systems) at a given company, in a given organization, or at a location or building at which computing system 102 is located. Specifically, controller 190 may include logic to communicate with other components of computing system 102 (e.g., such as communicate with processor 140 and/or firmware 110) to identify computing system 102 based on an identification for the computing system, such as a unique identification.

Moreover, controller 190 may include logic to communicate a request for firmware and identification of computing system 102 to server 180 via network 170, receive responses from server 180 related to those request, and send the responses received to firmware 110 and/or other components of computing system 102. For example, controller 190 may receive a "core corrupted" message, a request update data message, or a request firmware update message from portion 120. For example, the "core" may be defined as firmware 110 or a portion thereof. In response, controller 190 may send a "core corrupted" message, a request update data message, or a request firmware update data message to server 180. Controller 190 may then wait for and receive firmware update data from server 180 and provide that firmware update data to firmware 110. Moreover, controller 190 may include logic, such that controller 190 may write over or provide a pass-through interface for server 180 to write over portion 120 and/or portion 130 with firmware update data received from server 180.

In addition, computing system 102 includes chipset 125. Chipset 125 may include a computer chip, digital signal processor, firmware, circuitry, computer hardware and/or computer software stored therein, registers, buffers, computer logic, gates, etc. having the capability to perform the functions described with respect to the to chipset 125 herein. In some cases, controller 190 may monitor the progress of processor 140 by monitoring chipset 125 to monitor communication between firmware 110 and processor 140. Thus, chipset 125 allows controller 190 to monitor access of firmware 110 by processor 140 and return data from processor 140 to firmware 110 to detect whether there is an error during boot up of computing system 102. Specifically, chipset 125 may allow controller 190 to monitor communication between firmware 110 and processor 140 such that the access to a default address of firmware 110 to begin boot up of system 102, and return data go through chipset 125.

FIG. 1 also shows server 180 connected to computing system 102 over communication links 162 and 182, and network 170. Server 180 may be a computer "console," such as a server console monitored and controlled by an information technology (IT) administrator to control firmware configuration of computers at a business, company, location, or organization. For instance, an IT administrator may be a person working at or having access to server 180, or an automated application running on or having access to server 180 to provide firmware updates to computers at a business, company, location, or organization. Server 180 may have a memory storage database including configuration data and firmware updates for computing systems, such as computing system 102. In addition, server 180 may include operating system images. The firmware updates and operating system images of server 180 may be accessed by indexing a database in the server. Alternatively, firmware updates and operating system images may be provided from server 180 by an administrator (e.g., a person having access to server 180 or an automated application running on or having access to server 180), such as an information technology (IT) administrator selecting firmware and/or operating system images manually from the database in server 180 or otherwise loading the firmware and/or operating system image to server 180 for dissemination via network 170.

In one embodiment, server 180 may include a database of identification information, and related support data (e.g., such as firmware data, firmware updates, firmware images, operating system images, etc.). Appropriate identification information includes client systems identification (e.g., such as computing system 102) (e.g., such as an identification which may be a unique identification amongst other client systems of an organization), operating system versions, processor versions, firmware revision information, firmware release dates, etc. Specifically, server 180 may lookup, locate, and transmit or provide access to support data corresponding to client systems identification received from controller 190 (e.g., such as for various client systems identifications, firmware revisions, and/or firmware release dates). In some cases, server 180 may be accessed by an IT administrator so that actions of the IT administrator may lookup, locate, and transmit or provide access to the support data.

FIG. 1 shows firmware 110 including portion 120 and portion 130. Portion 120 and portion 130 may be portions of firmware that are all or a part of the total firmware of firmware 110. According to embodiments, including portion 120 and portion 130 may be collectively referred to as "core system" firmware, where portion 120 is part 1 or the "boot block" of the core system firmware, and portion 130 is part 2 or the "core" of the core system firmware. For example, portion 120 may be a first portion of firmware that is erase protected by hardware based protection and/or software based protection. As such, portion 120 may be an erase protected part or small fraction of firmware 110 that is erase protected from intentional or accidental erasure unless specific hardware mechanisms are used to erase portion 120 (e.g., such as irradiation with ultraviolet light). According to embodiments, portion 120 may represent data "burned" into a portion of a ROM, EPROM, or EEPROM chip. Thus, portion 120, the "burned" portion, may be "flash" erased by hardware mechanisms (e.g., such as by ultraviolet light irradiation).

In addition, portion 120 may include logic to discover and recognize the existence of controller 190 on the system platform (e.g., on computing system 102). For example, portion 120 may be capable of recognizing a hard-coded location and/or a run-time discovery of controller 190 on the system platform. Furthermore, portion 120 may include sufficient logic to discover corrupted firmware within firmware 110, such as using a checksum-based check, a signature-based check, and/or a hardware-based check to determine whether portion 130 is corrupted. Furthermore, portion 120 may include logic to communicate to controller 190. Hence, portion 120 may communicate to controller 190 that portion 120 and/or portion 130 are corrupted, or require updating. For example, portion 120 may request original, or updated firmware for portion 120 and/or portion 130 from controller 190. Portion 120 may also include sufficient logic to receive responses, original firmware, update firmware, and/or update data in response to the requests and take appropriate actions therewith, such as by updating portion 120 and/or portion 130 with the firmware or data.

Firmware 110 also includes portion 130, such as a firmware portion that is erasable. According to embodiments, portion 130 may represent data written or stored into a portion of a memory, ROM, EPROM, or EEPROM chip. For example, portion 130 may be written or programmed into a second portion of the ROM chip that portion 120 is programmed into, but portion 130 may not have the hardware or software erase protection of portion 120. Thus, portion 130 may be erased or written over by software mechanisms. Portion 130 may be much larger in data size than portion 120. Portion 130 may be designed for erasure, updating, or recovery caused by or from portion 120. Portions 120 and 130 may include configuration data for computing system 102. For example, the configuration data may include configurations of devices of or attached to computing system 102, such as keyboard/mouse interface 152 and monitor interface 154. It is contemplated that data from firmware 110 may be used to load configuration registers of computing system 102, such as to define operational parameters for the devices mentioned above.

Hence, according to embodiments, computing environment 100 allows firmware 110 to be updated when hung-up, corrupted, or at a certain time, whether or not the operating system of computing system 102 is functioning properly. For example, firmware 110 may be client system firmware (CSF) which resides on computing system 102, a client system, where the CSF has logic built into it to discover whether the CSF is corrupted, as well as the capability to "self-heal" or update corrupted CSF.

In one case, controller 190 may be an intelligent networking controller (INC), such as a controller having logic to support detecting of corrupted firmware and bringing computing system 102 to a state where it can interact with server 180 (e.g., over network 170). This logic allows controller 190 to retrieve original or updated firmware (e.g., such as code, data or images including software or programming providing firmware functions and/or device configuration information for computing system 102) for initially writing, updating, repairing, self-healing, recovering, and self-updating all or portions of firmware 110 (e.g., such as portion 120 and/or portion 130).

Similarly, portion 120 may be a part or portion of CSF containing enough logic functionality to bring computing system 102 to a state where portion 120 can interact with controller 190 and server 180 (e.g., over network 170). Here, the logic allows portion 120 to retrieve original or updated firmware for initially writing, updating, repairing, self-healing, recovering, and self-updating portions of firmware 110 (e.g., such as portion 130). The erase protection of portion 120 may be configured or built in to preserve logic to allow for recovery (e.g., such as using controller 190 and server 180) of portion 130.

Correspondingly, portion 130 may be a non-secure part or portion of CSF containing configuration data of components or devices of computing system 102. For example, portion 130 may be a main part of the firmware that is not as secure as portion 120, because portion 130 does not have a built in hardware or software mechanism similar to that for portion 120, to protect portion 130 from erasure. Thus, portion 130 may be flexible to allow for intentional erasure or field upgrading of portion 130. However it can be appreciated that this same flexibility makes portion 130 vulnerable to accidental erasure. Thus, if portion 130 is accidentally erased, portion 120 may provide for recovery of portion 130.

Server 180 may be a console with which a client system, such as computing system 102, may communicate to get appropriate firmware and/or operating system images. The firmware and/or operating system images can be selected from server 180 automatically by indexing into a database stored at server 180. Alternatively, an information technology (IT) administrator can select the firmware and/or operating system images manually, by selecting the correct firmware and/or operating system images from the database on server 180 and controlling the communication of the selected firmware and/or operating system images to computing system 102 over network 170.

Figure 2:
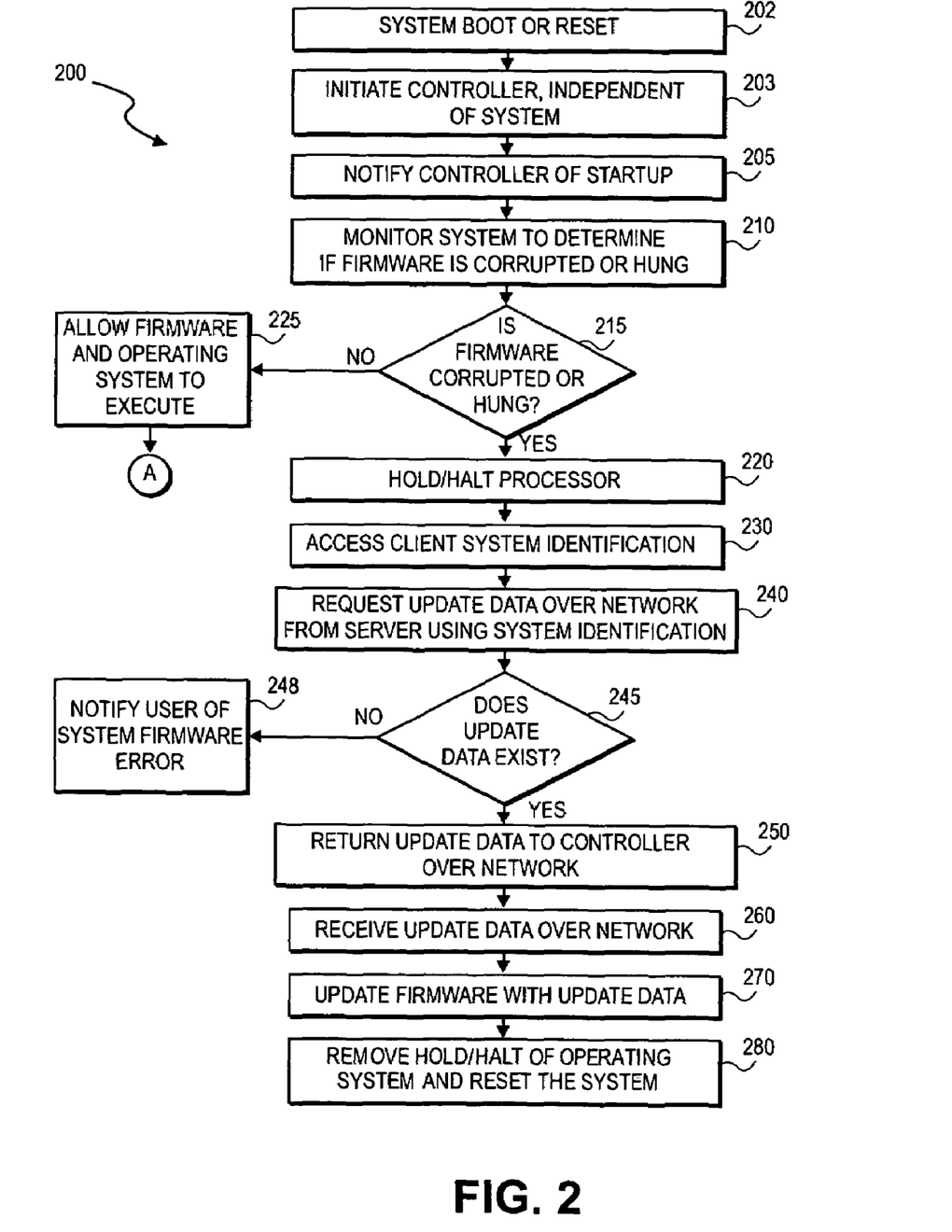
FIG. 2 is a flow diagram of a process to update firmware over a network.

FIG. 2 is a flow diagram of process 200 to update firmware over a network. At block 202 the system is booted or reset. For example, block 202 may correspond to turning on, resetting, initializing, or otherwise initiating power to a computing system, such as computing system 102. Next, at block 203 the controller is initiated or initialized, independent of the system's ability to continue booting, initializing, running firmware, running an operating system, or processing. For example, block 203 may correspond to controller 190 being initiated to initialize and configure itself to run firmware and then run firmware regardless of whether firmware 110, portion 120, and/or portion 130 or corrupted or hung-up. Similarly, controller 190 may perform the functions described above regardless of whether processor 140 is halted or held; regardless of whether the operating system of computing system 102 is halted, hung-up or soft-off; and/or regardless of whether computing system 102 is otherwise halted, hung-up, or soft-off.

At block 205 the controller, such as controller 190, is notified of client system start up, such as start up of computing system 102. Block 205 may include notification by hardware mechanisms (e.g., such as by hardware or circuitry) sending a predefined signal to the controller to indicate if booting of computing system 102 has been initiated (e.g., such as after the power to computing system 102 is turned on or after computing system 102 is "reset"). In addition, controller 190 may be notified of start up by software mechanisms, such as a predefined communications message sent to controller 190 to indicate booting of computing system 102. It is considered that the notification may include transmitting a predefined notification signal via a hardware interface, or transmitting a predefined software message via a communications interface between firmware 110 and controller 190.

At block 210 the system is monitored to determine if firmware is corrupted. For example, controller 190 may include methods or logic built into the firmware of controller 190 to monitor, determine, or discover if portion 120 is corrupted. In some embodiments, controller 190 may monitor the progress, such as using a hardware chipset, of booting, initialization, and/or firmware execution of computing system 102. Specifically, controller 190 may monitor the execution of portion 120 during boot up or initialization to determine whether portion 120 is corrupted or hung-up. In some cases, controller 190 may monitor the progress of processor 140 by monitoring a chipset between processor 140 and firmware 110. When computing system 102 boots up, processor 140 may access a default address within firmware 110 (e.g., such as an address of portion 120) and return data to firmware 110 depending on whether the boot up is successful (e.g., such as by monitoring processor 140 for expected responses during boot up or processing by processor 140). Referring to FIG. 1, according to embodiments, chipset 125 may be included in computing system 102 to allow controller 190 to monitor communication between firmware 110 and processor 140 such that the access to the default address and return data go through chipset 125. If during boot up, there is an error, processor sends an error message (e.g., such as and "FF") as return data to firmware 110. Similarly, an error or other message from processor 140 (e.g., such as a response from the processor to be compared with an expected response value) may indicate to controller 190 that the core is corrupt, firmware 110 or a portion thereof is corrupt, or that firmware or a processor is hung up. Specifically, controller 190 may monitor chipset 125 during or after boot up to sense valid data returned by the processor indicating successful boot up; or to detect the error message indicating boot up failure, "core corrupt", firmware corrupt, or processor hung up. Moreover, controller 190 may use client hardware of computing system 102 (e.g., such as a chipset), firmware of controller 190 or both to monitor the client systems progress.

At block 215 it is determined whether firmware is corrupted or hung-up. For example, at block 215 controller 190 may determine whether portion 120 is corrupted, such as by being erased, or having a "bug" or error in a feature or process of the firmware. Decision block 215 may include determining in accordance with the monitoring description above with respect to block 210. For example, block 215 may correspond to controller 190 monitoring a client chipset (e.g., such as chipset 125 of FIG. 1) to compare progress of startup, initialization, processor 140, or the operating system with expected responses thereof according to portion 120 or configuration data therein. If the expected response is inconsistent with the progress detected in the chipset, then portion 120 may be considered corrupted.

Moreover, block 215 may include monitoring whether a start up or initialization process for computing system 102 is hung-up. Specifically, if controller 190 determines via hardware of computing system 102, that portion 120 is hung-up (e.g., such as during execution of portion 120 during boot up or reset of computing device 102), then portion 120 may be considered hung-up.

If at block 215 controller 190 determines that portion 120 is corrupted or hung-up, processing continues to block 220. At block 220, controller 190 may use logic, hardware and/or software mechanisms to pause, halt, or hold the client system processor (e.g., such that the processor is "held"). Here, controller 190 may cause the system processor (e.g., such as processor 140, a system processor, or a central processing unit (CPU) of a client system) to discontinue processing of firmware, software, or operating system instructions. According to embodiments, controller 190 may also causes the operating system of computing system 102 to become halted, hung up, or to enter a soft-off status.

Figure 3:
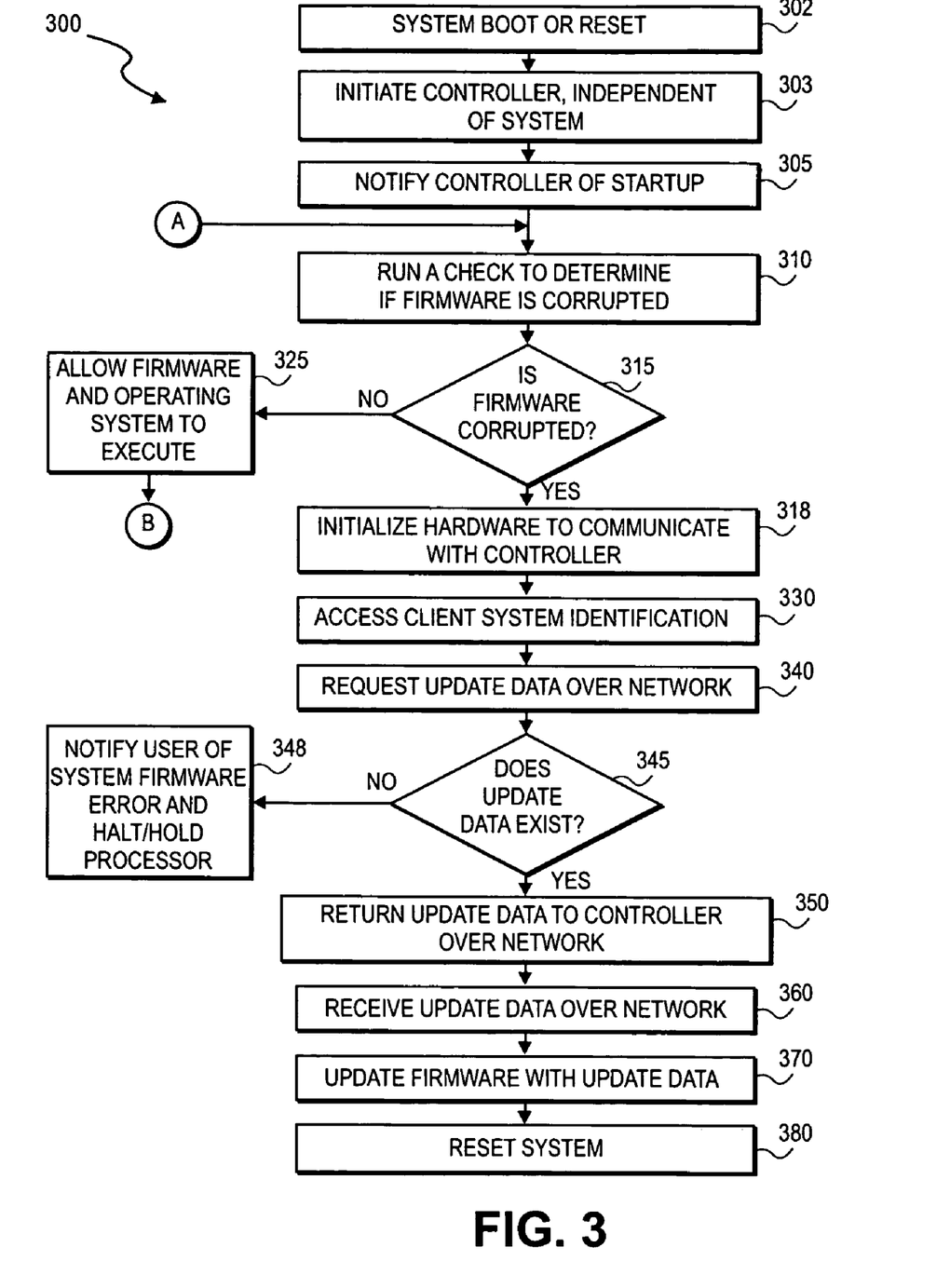
FIG. 3 is a flow diagram of a process to update firmware over a network.

If at block 215 controller 190 determines that portion 120 is not corrupted or hung-up, processing continues to block 225. At block 225 the firmware and operating system are allowed to execute. For example, block 225 may correspond to controller 190 allowing portion 120 to continue or complete execution during startup or initialization of computing system 102. After block 225, computing device 102 may be allowed to run computing processes according to the operating system, such as by transferring control to an operating system. Also, according to embodiments, after block 225, computing device 102 may be allowed to run portion 130 of firmware 110 (e.g., to complete running firmware 110 prior to transferring control to an operating system). For example, at "A", as shown in FIG. 2, process 200 may continue at "A" as shown in FIG. 3 (e.g., such as to continue at block 310 as shown and described with respect to FIG. 3.

At block 230 the controller accesses its local database to access its client system specific information, such as the unique identification of computing system 102. At block 240, controller 190 requests update data over the network over a server using system identification information. For example, controller 190 may send a request update firmware message or a "core corrupted" message, including system identification, to server 180. Specifically, Controller 190 may send a predefined message including the client system identification and identification of the problem (e.g., indication that portion 120 is corrupted and/or a request for updated data or firmware) to server 180 via network 170 (e.g., such as to a console application running on server 180 via network interface 160, communication links 162 and 182, and network 170).

At block 245 it is determined whether the update data exists. For example, server 180 may receive the request for updated firmware data or the "core corrupted" message from controller 190 and index a database within server 180 to determine whether a firmware image for the system identified by the system identification sent any message by controller 190 exists. More particularly, at block 245, server 180 either searches its local database for a firmware image, or sends a message to an IT administrator to get a firmware image for the identified client system (e.g., computing system 102). If server 180 finds a corresponding firmware image for the identified client within a specific time it sends a "successful" status message and the firmware image to computing system 102, such as using secure communication, encrypted data, and/or network packets over network 170. On the other hand if server 180 cannot locate a suitable firmware image for the client system identified, server 180 sends a "failure" status message to computing system 102 using similar mechanisms described above for the "successful" status message. In one case server 180 may time-out of a selected search time for finding a suitable firmware image for the client system identified (e.g., such as if server 180 does not have the client system identification or firmware therefor in its database). In another case, server 180 may time-out waiting for an IT administrator response to provide a suitable firmware image for the client system identified.

In addition, at block 245, the controller may poll hardware to determine whether a response has been received from the server. For example, controller 190 may poll hardware of computing system 102, such as network interface 160, to determine whether server 180 has provided a response to the firmware update data requests, via network 170. If, a response is not provided within a certain "timeout" time period during polling, processing may continue to block 248.

Meanwhile, controller 190 running in computing system 102 monitors network interface 160 or server 180 for a response and takes appropriate action in accordance with that response. If at block 245 update data does not exist, or the polling times out, processing continues to block 248 where the user is notified of a system firmware error. For example, if controller 190 receives a failure status message from server 180, controller 190 may cause a user understandable message to declare to the user that computing system 102 is in an unrecoverable system-firmware-error state. For example, controller may cause a monitor attached to computing system 102 to display a message indicating the error state, may cause computing system 102 to output a "beep" sequence indicating that the error exists, or otherwise notify the user of the error.

Alternatively, if 245 update data does exist and is transmitted to the controller prior to the polling timeout, polling processing continues to block 250. At block 250 update data is returned to the controller over the network. Here, as described above for block 245, server 180 sends a "successful" status message and the firmware image to computing system 102, such as using secure communication, encrypted data, and/or network packets over network 170.

At block 260 the update data is received by the controller over the network from the server. For example, controller 190 may receive a "successful" status message and firmware update data from server 180 via network 170. The firmware update data may include original firmware, firmware update data, or an firmware update image for portion 120.

Next, at block 270 the firmware is updated with the update data. For example, if controller 190 services a successful status message from server 180, controller 190 may program or overwrite portion 120 with the firmware update data received with the successful status message.

At block 280, firmware 110 is recovered and controller 190 removes any halt or hold on the operating system, computing system 102, or processor 140. Thus, after any halt or hold is removed, the system (e.g., computing system 102) may be reset. For example, block 280 may return to block 202 of process 200 to reboot computing device 102 with the updated, non-corrupt, appropriate portion 120.

Moreover, according to embodiments, portion 120 may monitor portion 130 to determine whether portion 130 is corrupted. The process of portion 120 monitoring portion 130 may occur independently or in a system not including controller 190 monitoring portion 120. However, in such a system, controller 190 will still be necessary to request and receive firmware update data for portion 130 from server 180. Conversely, processes having portion 120 monitoring portion 130 may be an embodiment including the above description of controller 190 monitoring portion 120, such as where portion 120 monitors portion 130 after controller 190 monitors portion 120.

For instance, FIG. 3 is a flow diagram of process 300 to update firmware over a network. At block 302 the system is booted or reset. For example, block 302 may correspond to the description above for block 202. Next, at block 303 the controller is initiated or initialized, independent of the system's ability to continue booting, initializing, running firmware, running an operating system, or processing. For example, block 303 may correspond to the description above for block 203. At block 305 the controller, such as controller 190, is notified of client system start up, such as start up of computing system 102. For example, block 305 may correspond to the description above for block 205.

At block 310 the system is monitored to determine if firmware is corrupted. For example, portion 120 may include methods or logic built into the firmware of portion 120 to monitor, determine, or discover if portion 130 is corrupted.

As noted above, it is also contemplated that block 310 of process 300 may occur after block 225, as shown in FIG. 2. Thus, after process 200 provides for appropriate boot up using portion 120, as shown in FIG. 2, process 300, starting at block 310 may be performed to determine whether portion 130 is corrupted.

For example, at block 310, portion 120 may monitor processor 140, the operating system running on computing system 102, the client chipset mentioned above (e.g., such as chipset 125 of FIG. 1), or other hardware to determine whether portion 130 is corrupted. Moreover, at block 310 portion 120 may perform a checksum-based check, a signature-based check, and/or a hardware-based check to determine whether portion 130 is corrupt. Block 310 may also include monitoring of chipset 125 by controller 190 as described above for block 210, and/or monitoring the operating system of computing system 102 to determine or detect whether portion 130 is corrupted.

At block 315 it is determined whether firmware is corrupted or hung-up. For example, at block 315 portion 120 may determine whether portion 130 is corrupted, such as by being erased, or having a "bug" or error in a feature or process of the firmware. Decision block 315 may include determining in accordance with the monitoring description above with respect to block 310. For example, block 315 may correspond to portion 120 or controller 190 monitoring a client chipset (e.g., such as chipset 125 of FIG. 1) to compare progress of startup, initialization, processor 140, or the operating system with expected responses thereof according to portion 130 or configuration data therein. If the expected response is inconsistent with the progress detected in the chipset (e.g., such as by including and error or "FF" message), then portion 130 may be considered corrupted.

Moreover, block 315 may include determining whether processor 140 is held or halted, determining whether a start up or initialization process for computing system 102 is hung-up, determining whether an operating system running on computing system 102 is halted, hung-up or soft-off, and/or determining whether firmware (e.g., such as firmware 110) of computing system 102 is corrupted or hung-up. For example, block 315 may correspond to portion 120 performing a or monitoring a checksum-based check, a signature-based check or a hardware-based check of portion 130.

Figure 4:
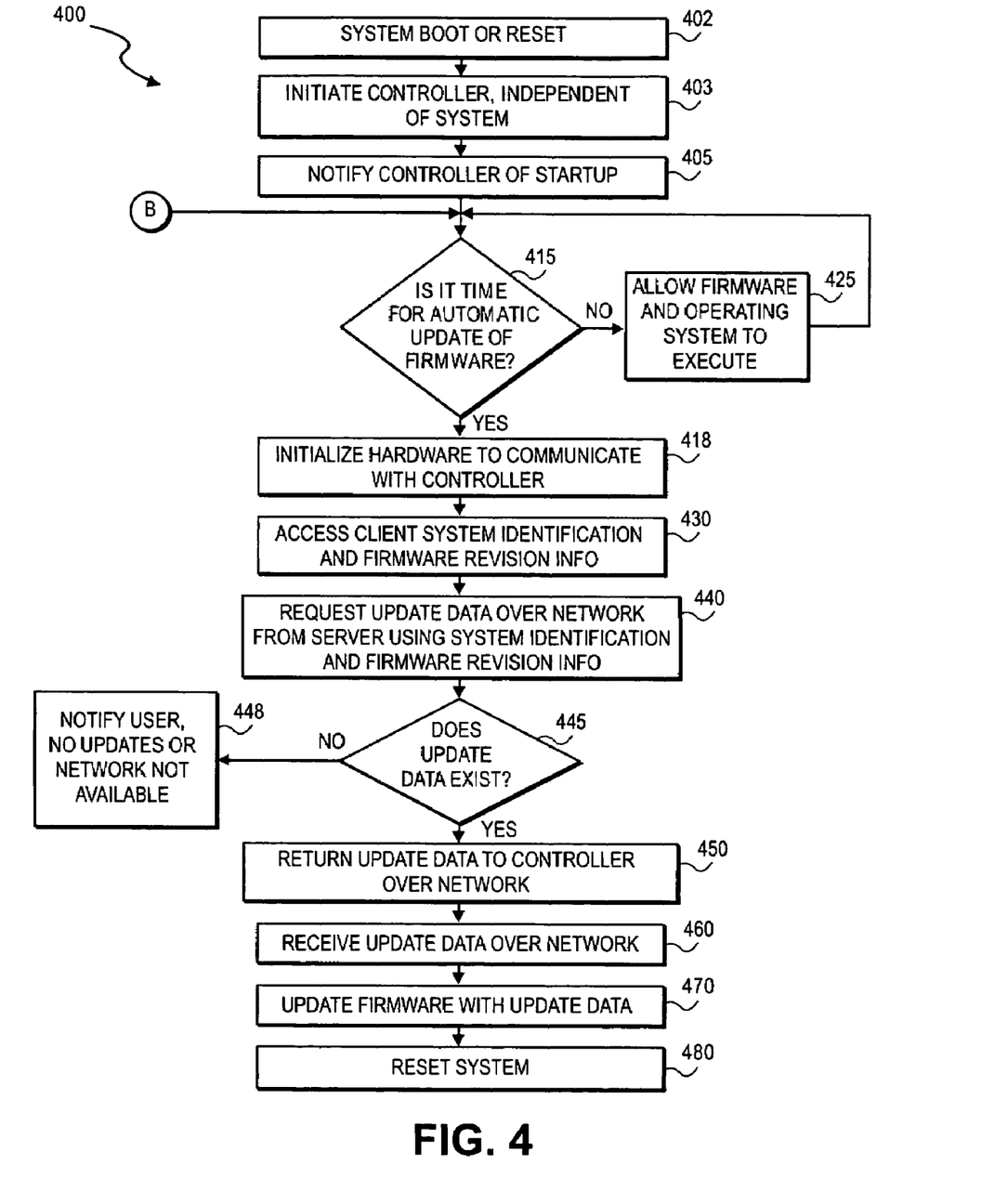
FIG. 4 is a flow diagram of a process to automatically update firmware over a network.

If at block 315 it is determined that portion 130 is not corrupted, processing continues to block 325. At block 325 the firmware and operating system are allowed to execute. For example, block 325 may correspond to portion 120 and controller 190 allowing portion 130 to continue or complete execution during startup or initialization of computing system 102. Thus, block 225, may correspond to computing device 102 being allowed to run computing processes according to the operating system, such as by transferring control to an operating system. Also, according to embodiments, after block 225, computing device 102 may be allowed to check for automatic updates, such as updates scheduled at a specific time or periodically, to update firmware 110, portion 120, and/or portion 130. For example, at "B", as shown in FIG. 3, process 200 may continue at "B" as shown in FIG. 4 (e.g., such as to continue at block 415 as shown and described below with respect to FIG. 4).

Alternatively, if at block 315 it is determined that portion 130 is corrupted, processing continues to block 318. At block 318 hardware to communicate with the controller is initialized. For example, if portion 120 determines that portion 130 is corrupted, portion 120 may use hard-coded system parameters to initialize a minimal set of hardware necessary to configure and communicate with controller 190. Portion 120 then sends a predefined message to controller 190, with parameters identifying that portion 130 is corrupted. Similarly, portion 120 may send a predefined message to controller 190, with parameters requesting update or recovery of portion 120 and/or 130. Portion 120 then polls for a response from controller 190 on the hardware initialized by the hard-coded system parameters, as described above.

After block 318, process 300 continues to block 330 where the client system identification is accessed. Block 330 may correspond to controller 190 accessing an identification for the client system (e.g., such as computing system 102). For example, block 330 may correspond to block 230 as described above.

After block 330, processing continues to block 340 where update firmware data is requested over a network. For example, controller 190 may request update data for portion 120 and/or 130 from server 180 over network 170 using a message and system identification information as described above for block 240. In addition, system identification information sent at block 340 may include identification that the firmware requested is for portion 120 and/or 130 of firmware 110.

After block 340, processing continues to block 345 where it is determined whether update data exists. Block 345 may correspond to block 245 as described above. For instance, server 180 may not find appropriate update firmware data corresponding to the system identification provided, or controller 190 may time out from polling hardware.

Meanwhile, controller 190 running in computing system 102 monitors network interface 160 or server 180 for a response and takes appropriate action in accordance with that response. If at decision block 345, an update does not exist, processing continues to block 348 where the user is notified of a system firmware error, such as is described above for block 248. In addition, at block 348, controller 190 sends an error response to portion 120 indicating that firmware for portion 130 was not obtained. Consequently, portion 120 may receive the failure status message from controller 190, and cause the notification to the user to occur, such as through a display, through beeps, or other methods available to computing system 102.

If update data does exist at block 345, processing continues to block 350 where update data is returned to the controller over the network. Block 350 may correspond to the description above of block 250. Processing then continues at block 360 where the update data is received by the controller over the network from the server.

At block 360 the update data is received by the controller over the network from the server. For example, controller 190 may receive a "successful" status message and firmware update data from server 180 via network 170. The firmware update data may include original firmware, firmware update data, or a firmware update image for portion 120 and/or 130. Specifically, controller 190 may download the update data for portion 120 and/or 130 from server 180 and copy the update data into system memory (e.g., such as memory 142) and send a successful status message to portion 120. Alternatively, controller 190 may prepare a console or server pass-through interface to download the update data directly to portion 120 and/or 130 (e.g., by overwriting the data currently in 120 and/or portion 130 with the update data) and send a successful status message to portion 120.

Next, at block 370 the firmware is updated with the update data. For example, if controller 190 services a successful status message from server 180, controller 190 may program or overwrite portion 120 and/or 130 with the firmware update data received with the successful status message. Moreover, if portion 120 receives a successful status message, portion 120 may read update data stored in memory (e.g., such as memory 142) or may allow for or read the data from the pass-through interface described above to program, write, or overwrite the update data into portion 120 and/or 130.

At block 380, firmware 110 is recovered and controller 190 and/or portion 120 resets the client system. For example, portion 120 may reset computing system 102 using system specific processes. For example, block 380 may return to block 302 of process 300 to reboot computing device 102 with the updated, non-corrupt, appropriate portion 130.

Thus, it is considered that blocks 230, 240, 245, 248, 250, 260, and 270 may apply to accessing, requesting, inquiring, returning, receiving, and updating portion 130 only, such as by portion 130 controlling the actions taken in those blocks to write over or update portion 130. Alternatively, those blocks may apply to portion 120 and portion 130, such as by controller 190 controlling those actions to write over or update both portion 120 and 130, during the same set of actions.

In addition, according to embodiments, firmware 110 may be automatically updated, such as updated at a specific time or periodically by checking for and receiving updates from server 180 (e.g., such as to update portion 120, and/or portion 130). The process of automatically updating firmware 110 may occur independently or in a system not including controller 190 monitoring portion 120 and/or portion 120 monitoring portion 130. However, in such a system, controller 190 will still be necessary to request and receive firmware update data for firmware 110 from server 180. Conversely, processes having automatic update of firmware 110 may be an embodiment including the above description of controller 190 monitoring portion 120, and/or where portion 120 monitors portion 130.

For instance, FIG. 4 is a flow diagram of process 400 to automatically update firmware over a network. At block 402 the system is booted or reset. For example, block 402 may correspond to the description above for block 202. Next, at block 403 the controller is initiated or initialized, independent of the system's ability to continue booting, initializing, running firmware, running an operating system, or processing. For example, block 403 may correspond to the description above for block 203. At block 405 the controller, such as controller 190, is notified of client system start up, such as start up of computing system 102. For example, block 405 may correspond to the description above for block 205.

At block 415 the system is monitored to determine if it is time for an automatic update of all or a portion of firmware 110. According to embodiments, controller 190 or portion 120 may include logic to monitor a clock signal to determine whether it is a selected time or whether a selected period of time since the last automatic update or attempt has expired. Thus, block 415 may occur whether or not boot up, processor 140, or the operating system of computing system 102 are running, halted, held up, hung up, or soft-off. If it is the selected time or the period has expired, it is now time for an automatic update of portion 120 and/or portion 130.

As noted above, it is also contemplated that block 415 of process 400 may occur after block 325, as shown in FIG. 3. Thus, after process 300 provides for appropriate boot up using portion 130, as shown in FIG. 3, process 400, starting at block 415 may be performed to determine whether an automatic update is required.

If at block 415 it is not time for an automatic update of firmware, processing continues to block 425. At block 425 the firmware and operating system are allowed to execute. For example, block 425 may correspond to firmware 110 and controller 190 allowing startup or initialization of computing system 102 to continue. Block 425 may also correspond to when the operating system of computing device 102 is operating, and thus may allow computing device 102 to continue to run computing process according to the operating system.

Alternatively, if at block 415 it is time for an automatic update of firmware, processing continues to block 418. At block 418 hardware to communicate with the controller is initialized. For example, if it is time for an automatic update, portion 120 may use hard-coded system parameters to initialize a minimal set of hardware necessary to configure and communicate with controller 190. Portion 120 then sends a predefined message to controller 190, with parameters identifying that it is time for an automatic update of portion 120 and/or portion 130.

Alternatively, portion 120 may send a message to controller 190 indicating that portion 130 is corrupted and/or a request to update or recover portion 130. In this case, block 418 may correspond to the description above for block 318. Portion 120 then polls for a response from controller 190 on the hardware initialized by the hard-coded system parameters, as described above. For instance, portion 120 may monitor network interface 160 or controller 190, such as by polling hardware of computing system 102 (e.g., such as by network interface 160) to determine if server 180 has responded After block 418, process 400 continues to block 430 where the client system identification is accessed. Block 430 may correspond to controller 190 accessing an identification for the client system (e.g., such as computing system 102) and/or the firmware to be automatically updated. For example, block 430 may correspond to block 230 or block 330 as described above. Moreover, at block 430, if it is time for an automatic update, controller 190 may accesses its local database to search for client system identification, as well as revision information, release date, etc., for firmware 110.

At block 440, controller 190 requests update data over the network over a server using system identification information. For example, controller 190 may send an automatic update message, a request firmware update message, or a "core corrupted" message, including system identification, to server 180.

Specifically, Controller 190 may send controller 180 a predefined message including the client system identification as well as the revision information, release date, etc. (e.g., such as the revision information, release date, etc. for portion 120 and/or portion 130). Communication of the message from controller 190 to server 180 may correspond to the description thereof for block 240.

Consequently, at block 445, server 180 interprets the message received from controller 190 as an automatic update request, and searches the data based of server 180 for a later or subsequent revision to the revision information, release date, etc., provided in the message from controller 190. Alternatively, at block 445, server 180 may send a message to an IT administrator requesting an image for the client system.

Meanwhile, controller 190 running in computing system 102 monitors network interface 160 or server 180 for a response and takes appropriate action in accordance with that response. Indexing databases, polling, and determining whether update data exists at server 180 may correspond to the description thereof for block 345. For example, if at decision block 445, polling by portion 120, determines that controller 190 did not receive a message from server 180 before a selected timeout period, processing continues to block 448 where firmware 110 sends the user a message indicating "network not available" (e.g., network 170), such as through a displayed message from computing system 102.

Also, if at decision block 445, an update does not exist, such as if the server does not find a match before a selected timeout period at the server, server 180 sends controller 190 a message indicating "no automatic update available". Then, process 400 continues to block 448 where processor 190 causes the user to be notified that "no automatic update available", such as through a displayed message from computing system 102.

Moreover, at block 448, controller 190 may send a "no automatic update available" message to firmware 110. After firmware 110 receives a "no automatic update available" message, firmware 110 may cause the user to be notified with a "network not available" message, such as through a displayed message from computing system 102. At block 448, after firmware 110 receives a "no automatic update available", or "network not available" message, firmware 110 may allow computing system 102 to continue booting, startup, initialization, or running the operating system, since process 400 is for an automatic update (e.g., presuming that the firmware is not corrupted or hung-up).

If update data does exist at block 445, processing continues to block 450 where update data is returned to the controller over the network. Block 450 may correspond to the description above of block 250. For instance, at block 450, server 180 may return a "successful" status message and a suitable later revision to the firmware image for computing system 102, such as using a secure server session, encrypted data, and/or network packet. Processing then continues to block 460 where the update data is received by the controller over the network from the server.

At block 460 the update data is received by the controller from the server over the network. For example, controller 190 may receive a "successful" status message and firmware update data from server 180 via network 170. The firmware update data may include original firmware, firmware update data, or a firmware update image for all or a portion of firmware 110. Specifically, controller 190 may download the update data for firmware 110 from server 180 and copy the update data into system memory (e.g., such as memory 142) and send a successful status message to portion 120. Alternatively, controller 190 may prepare a console or server pass-through interface to download the update data directly to firmware 110 (e.g., by overwriting the data currently in firmware 110 with the update data) and send a successful status message to portion 120.

Next, at block 470 the firmware is updated with the update data. For example, if controller 190 services a successful status message from server 180, controller 190 may program or overwrite firmware 110 (e.g., portion 120 and portion 130) with the firmware update data received with the successful status message. Moreover, if portion 120 receives a successful status message, portion 120 may read update firmware data stored in memory (e.g., such as memory 142) or may allow for or read the update data from the pass-through interface described above to program, write, or overwrite firmware 110 with the update firmware data. Here, portion 120, which is polling hardware for a response, will receive the successful status message and the new or later revision of the firmware image, either from system memory (e.g., such as memory 142) or through a server pass-through interface and write or allow the update to be written over portion 130.

At block 480, firmware 110 is updated and controller 190 and/or portion firmware 110 resets the client system. For example, portion 120 may reset computing system 102 using system specific processes. It is also contemplated that block 480 may return to block 402 of process 400 to reboot computing device 102 with the automatically updated firmware 110.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. An apparatus comprising:
a processor to run an operating system;
firmware having a first portion and a second portion including configuration data, the first portion including logic to monitor the second portion to determine whether the second portion is corrupted; and
a controller including firmware to send a message over a network to a server to request updated configuration data, wherein the message is to request the updated configuration data from a database stored in a memory of the server, to receive the updated configuration data over the network, and to write over at least a portion of the second portion with the returned updated configuration data, and wherein the message includes an identification of a computing system that includes the processor and the firmware;
wherein the first portion includes logic to monitor a clock signal to determine whether it is a selected time or whether a period of time has expired indicating that an update of the configuration data is required and wherein the first portion activates one of a hardware component to send a predefined notification signal, and a software component to send a predefined communications software notification message to the controller to indicate to the controller whether booting of the computing system has been initiated.

2. The apparatus of claim 1, wherein the first portion includes firmware to monitor a client chipset to compare progress of the processor with expected responses of the processor according to the configuration data.

3. The apparatus of claim 1, wherein the first portion is coupled to the second portion, and includes logic to monitor the second portion to determine whether the second portion is one of halted or hung up.

4. The apparatus of claim 3, wherein the first portion includes logic to halt the processor when the second portion is one of corrupted, halted and hung up.

5. The apparatus of claim 4, wherein the first portion includes circuitry or firmware for executing if the second portion is one of corrupted, halted and hung up.

6. The apparatus of claim 1, wherein the first portion is stored in an erase protected memory, the memory including hard-coded system parameters to send a pre-defined message to a controller to indicate that the second portion is corrupted.

7. The apparatus of claim 6, wherein the controller includes one of an embedded micro-controller, a firmware, and a circuit.

8. The apparatus of claim 6, wherein the first portion includes logic to perform one of a checksum-based check, a signature-based check, and a hardware-based check of the second portion.

9. The apparatus of claim 1, wherein the logic includes one of circuitry, firmware, software code, digital data, and software.

10. A computer implemented method comprising:
monitoring a computing system to determine whether a firmware of the computing system is corrupted;
requesting from the computing system, update data over a network to update the corrupted portion of firmware if the portion is corrupted;
monitoring a progress of the system;
detecting an inconsistency between an expected response according to the firmware and the progress;
detecting a difference in a function performed by a device of the computing system and an expected response from the device determined using a configuration for the device stored in the firmware;
causing a processor of the computing system to be held from processing if it is determined that the firmware is corrupted;
updating the corrupted firmware if either (1) the firmware is hung up or halted, or (2) the processor is held; and
wherein updating includes requesting firmware update data for the firmware at a selected time or after a selected interval of time, wherein requesting the update includes: requesting update after either (1) the firmware is hung up or halted, or (2) the processor is held.

11. The computer implemented method of claim 10, wherein monitoring includes:
performing one of a checksum-based check, a signature-based check, and a hardware-based check.

12. The computer implemented method of claim 10, wherein monitoring includes:
determining that the firmware is corrupted if the firmware is hung up or halted.

13. A computer implemented method comprising:
receiving firmware update data over a network connection;
updating a firmware of a computing system with the firmware update data;
wherein receiving and updating occurs if the firmware of the computing system is halted;
wherein updating includes requesting firmware update data for the firmware at a selected time or after a selected interval of time; and
wherein the firmware includes a first portion and a second portion, and updating includes updating the second portion of the firmware with updated second portion data requested over a network by the first portion of the firmware;
wherein updating includes updating the firmware to one of:
remove an error in a feature or process of the firmware, add a feature or process to the firmware, and enhance a feature or process of the firmware, and
wherein the selected time or the selected interval of time is selected by an administrator or during manufacturing of a portion of the computing system.

14. The computer implemented method of claim 13, wherein updating comprises:
updating a first portion of the firmware with updated first portion data requested over the network; and then
updating a second portion of the firmware with updated second portion data requested by the first portion.

15. The computer implemented method of claim 13, wherein updating includes:
requesting firmware update data using a unique identification for the computing system;
receiving firmware update data over the network from a server;
returning the firmware update data to the firmware or writing over the firmware with the firmware update data.

16. The computer implemented method of claim 13, wherein receiving includes one of using a secure server session and using encrypted data.

* * * * *